US008384784B2

(12) United States Patent
Goh

(10) Patent No.: US 8,384,784 B2
(45) Date of Patent: Feb. 26, 2013

(54) DIGITAL PHOTOGRAPHING APPARATUS AND METHOD OF CONTROLLING THE SAME

(75) Inventor: Ji-hyun Goh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 547 days.

(21) Appl. No.: 12/634,859

(22) Filed: Dec. 10, 2009

(65) Prior Publication Data

US 2010/0165114 A1 Jul. 1, 2010

(30) Foreign Application Priority Data

Dec. 26, 2008 (KR) .................. 10-2008-0134961

(51) Int. Cl.
*H04N 5/225* (2006.01)
*G06K 9/00* (2006.01)

(52) U.S. Cl. ........................ 348/169; 382/118

(58) Field of Classification Search ............ 348/169
See application file for complete search history.

(56) References Cited

U.S. PATENT DOCUMENTS

2007/0286463 A1* 12/2007 Ritzau et al. .................. 382/118
2008/0084569 A1* 4/2008 Shin .............................. 358/1.5

* cited by examiner

*Primary Examiner* — Wing F Chan
*Assistant Examiner* — David X Yi
(74) *Attorney, Agent, or Firm* — Drinker Biddle & Reath LLP

(57) ABSTRACT

Provided is a method of controlling a digital photographing apparatus. The method includes: determining a target subject; determining whether the target subject exists in a moving image photographing domain; determining whether a condition of temporarily stopping recording of a moving image based on whether the target subject exists is satisfied; and temporarily stopping the recording of a moving image when the condition is satisfied.

21 Claims, 9 Drawing Sheets

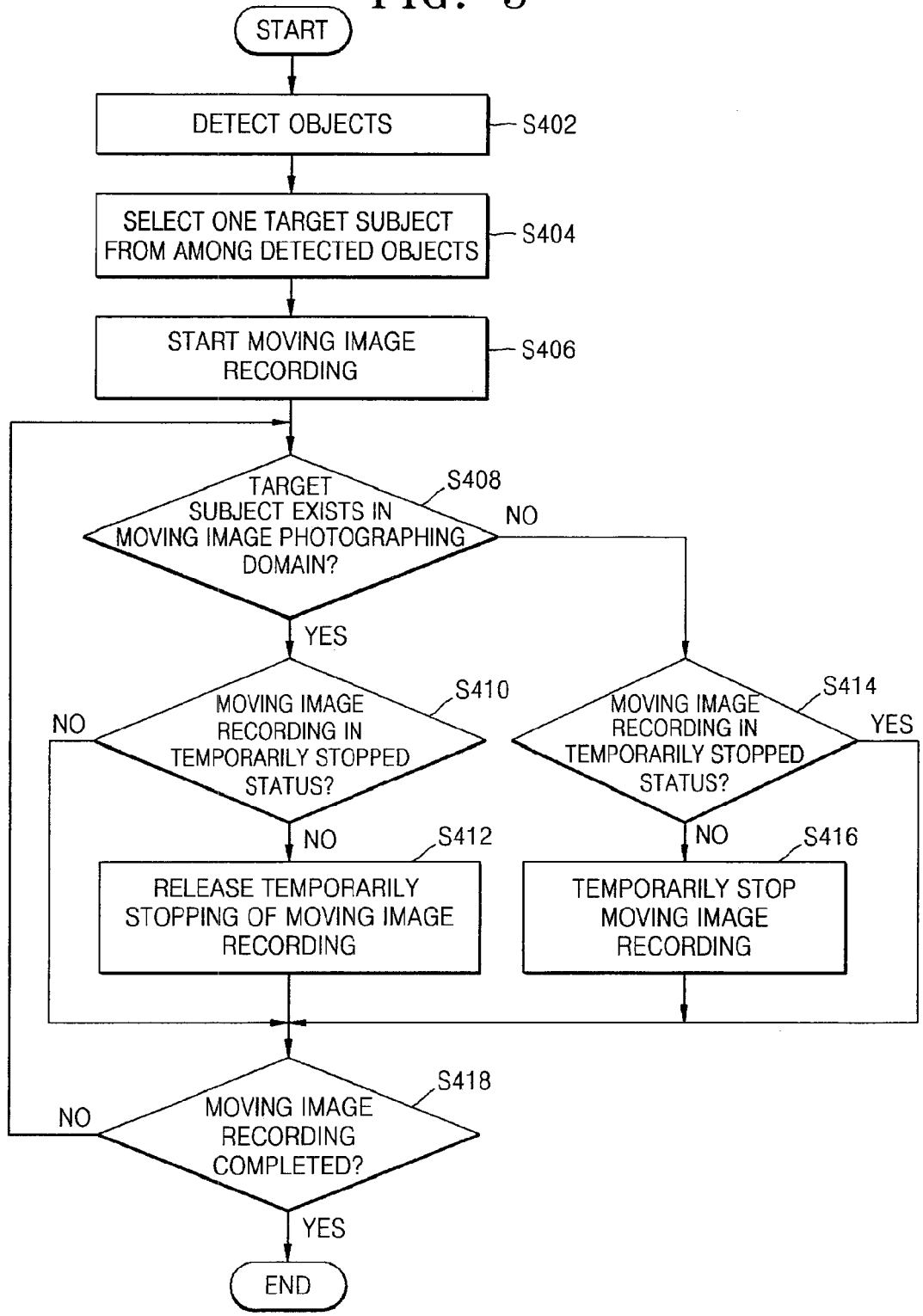

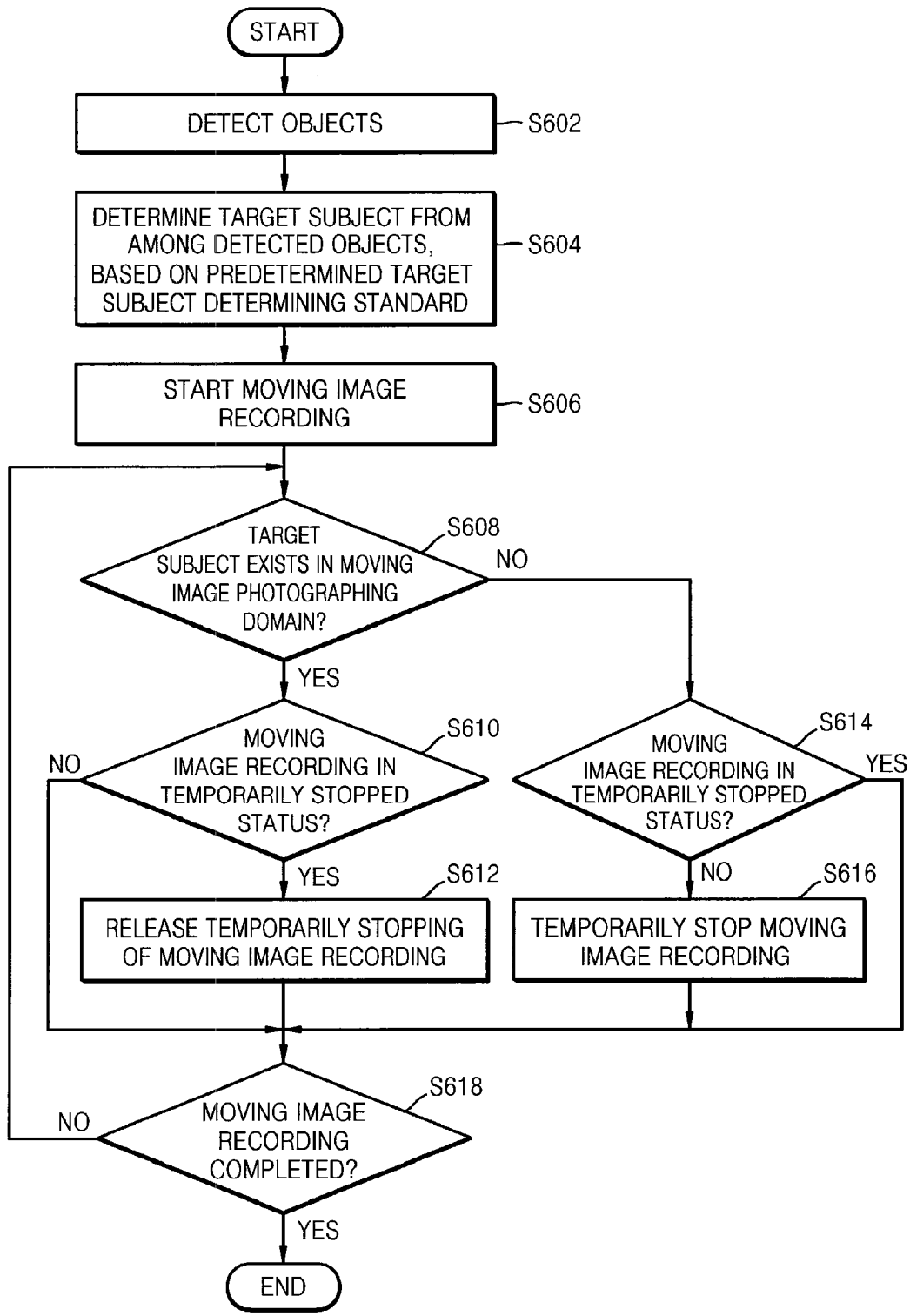

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2008-0134961, filed on Dec. 26, 2008, in the Korean Intellectual Property Office, the disclosure of which is incorporated herein in its entirety by reference.

BACKGROUND

The present invention relates to a digital photographing apparatus and a method of controlling the same, and more particularly, to a technology of temporarily stopping moving image recording while a digital photographing apparatus is recording a moving image.

Digital photographing apparatuses having a moving image recording function are well known. The digital photographing apparatuses receive an image in a frame unit, and generate a moving image file by converting and compressing the received image. Since an operation of converting and compressing the received image requires a plurality of processes, the digital photographing apparatuses may be complex.

The moving image file generated as above includes a plurality of frames, and thus capacity of the moving image file is generally larger than capacity of an image file. Also, since the plurality of frames are displayed when the moving image file is displayed, a reproduction time is long. Many recent digital photographing apparatuses are provided in a form of mobile apparatuses, but since storage capacity of the mobile apparatuses is limited, a moving image file generated in the digital photographing apparatuses consumes a lot of storage capacity.

Most digital photographing apparatuses having a moving image recording function have a function of temporarily stopping moving image recording. Such a function temporarily stops recording of a moving image without completing the recording of a moving image, and restarts the recording when desired. A user may use the function so as to limit an input of unnecessary information by stopping recording of a moving image when required. Also, since the function enables the user to only record a moving image that the user wants and generate one moving image file, it is convenient for the user to edit content of the moving image file while recording the moving image.

By using the function, an amount of input frames may be reduced. Accordingly, an amount of frames that are to be processed by a digital photographing apparatus is reduced, and a size of generated moving image file is reduced. Also, since unnecessary information is not included in the moving image file, a reproduction time is reduced while displaying the moving image and it is convenient to search for a moving image that is displayed.

SUMMARY

An embodiment of the present invention provides a digital photographing apparatus which automatically performs a function of temporarily stopping moving image recording by recognizing a target subject in a photographing domain of the digital photographing apparatus while recording a moving image. Specifically, embodiments provides a digital photographing apparatus which automatically performs a function of temporarily stopping moving image recording based on whether a target subject exists in a photographing domain when a user indicates the target subject.

According to an aspect of the present invention, there is provided a method of controlling a digital photographing apparatus, the method including: determining a target subject; determining whether the target subject exists in a moving image photographing domain; determining whether a condition of temporarily stopping recording of a moving image based on whether the target subject exists is satisfied; and temporarily stopping the recording of a moving image on the digital photographing apparatus when the condition is satisfied. The method may further include detecting objects existing in the moving image photographing domain, wherein the determining of the target subject may determine at least one of the objects as the target subject. The objects may be faces of people.

The method may further include releasing the temporarily stopping of the moving image recording when the condition is not satisfied and the moving image recording is temporarily stopped, wherein the determining of whether the target subject exists, the determining of whether the condition is satisfied, and the temporarily stopping of the moving image recording when the condition is satisfied may be repeated until the moving image recording is completed.

According to an embodiment, the determining of the target subject may determine an object selected by a user from among the detected objects as the target subject, and the condition may be temporarily stopping the moving image recording when the target subject does not exist in the moving image photographing domain.

According to another embodiment, the determining of the target subject may determine a plurality of objects selected by a user from among the detected objects as a plurality of target subjects, the method may further include determining the condition according to a user input, wherein the temporarily stopping of the moving image recording may temporarily stop the moving image recording when none of the plurality of target subjects exist in the moving image photographing domain in case that the condition is temporarily stopping the moving image recording when none of the plurality of target subjects exist in the moving image photographing domain, and temporarily stop the moving image recording when at least one of the plurality of target subjects does not exist in the moving image photographing domain in case that the condition is temporarily stopping the moving image recording when at least one of the plurality of target subjects does not exist in the moving image photographing domain.

According to another embodiment, the determining of the target subject may determine the target subject from among the detected objects based on a predetermined target subject determining standard, and the condition may be temporarily stopping the moving image recording when the target subject does not exist in the moving image photographing domain. The predetermined target subject determining standard may be at least one of determining an object in the middle from among the detected objects as the target subject, and determining an object that is nearest to the center of the moving image photographing domain as the target subject.

According to another embodiment, the determining of the target subject may determine an object selected by a user from among the detected objects as the target subject, and the condition may be temporarily stopping the moving image recording when the target subject exists in the moving image photographing domain.

According to another embodiment, the determining of the target subject may determine a domain indicated by a user as the target subject, and the condition may be temporarily stopping the moving image recording when the target subject exists in the moving image photographing domain.

According to another aspect of the present invention, there is provided a digital photographing apparatus includes: a target subject determining controller which determines a target subject; a condition determiner which determines whether the target subject exists in a moving image photographing domain and determines whether a condition of temporarily stopping recording of a moving image based on whether the target subject exists is satisfied; and a moving image recording controller which temporarily stops moving image recording when the condition is satisfied. The digital photographing apparatus may further include an object detector which detects objects existing in the moving image photographing domain, wherein the target subject determining controller may determine at least one of the detected objects as the target subject. The objects may be faces of people.

The moving image recording controller may release the temporarily stopping of the moving image recording when the condition determiner determines that the condition is not satisfied and the moving image recording is temporarily stopped, and the condition determiner may periodically determine whether the condition is satisfied until the moving image recording is completed.

The target subject determining controller and the condition determiner may be differently configured according to the embodiments.

According to another aspect of the invention, a computer readable storage medium storing thereon instructions for a computer program that are executable on a processor is provided, comprising: code for determining a target subject; code for determining whether the target subject exists in a moving image photographing domain; code for determining whether a condition of temporarily stopping moving image recording based on whether the target subject exists is satisfied; and code for temporarily stopping the moving image recording when the condition is satisfied.

The computer program may further comprises code for detecting objects existing in the moving image photographing domain, wherein the code for determining the target subject determines at least one of the detected objects as the target subject, and may further comprise: code for releasing the temporarily stopping of the moving image recording when the condition is not satisfied and the moving image recording is temporarily stopped, and the code for determining the target subject, the code for determining whether the condition is satisfied, and the code for temporarily stopping the moving image recording when the condition is satisfied are repeated until the moving image recording is completed.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart illustrating a method of controlling a digital photographing apparatus, according to another embodiment of the present invention;

FIG. 7 is a flowchart illustrating a method of controlling a digital photographing apparatus, according to another embodiment of the present invention;

DETAILED DESCRIPTION OF THE EMBODIMENTS

Hereinafter, the present invention will be described more fully with reference to the accompanying drawings, in which exemplary embodiments of the invention are shown. The detailed descriptions and enclosed drawings are for understanding various embodiments of present invention, and descriptions that may be easily realized by one of ordinary skill in the art may be omitted.

The exemplary embodiments and drawings should be considered in descriptive sense only and not for purposes of limitation. Therefore, the scope of the invention is defined not by the detailed description of the invention but by the appended claims. Terms used to describe the present invention have the meanings and concepts corresponding to the technical aspects of the present invention in order to mostly suitably express the present invention.

Embodiments of the present invention will now be described with reference accompanying drawings.

Figure 1:
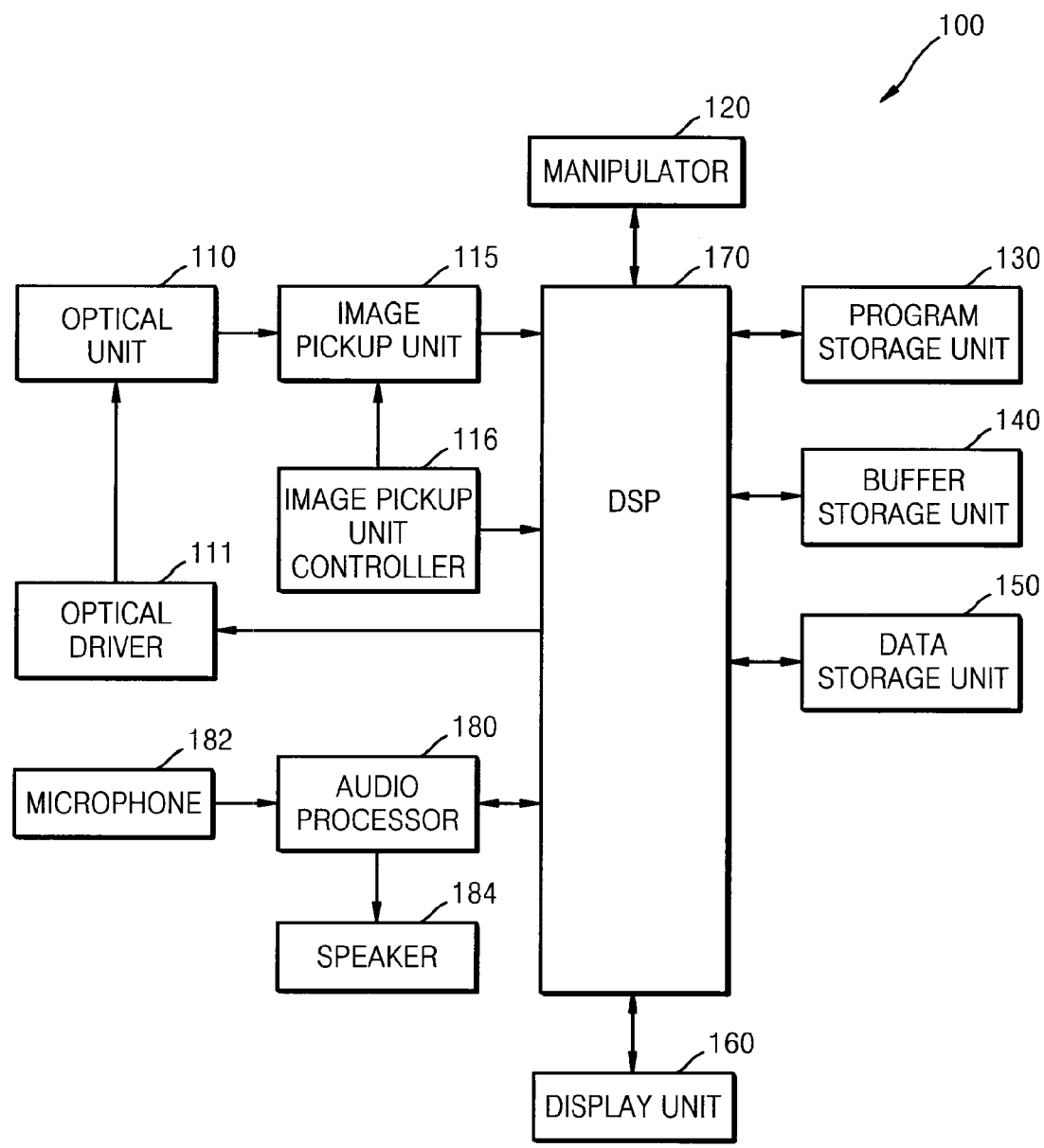
FIG. 1 is a block diagram illustrating an exemplary structure of a digital photographing apparatus.

FIG. 1 is a diagram illustrating an exemplary structure of a digital photographing apparatus 100.

The digital photographing apparatus 100 includes an optical unit 110, an optical driver 111, an image pickup unit 115, an image pickup unit controller 116, a manipulator 120, a program storage unit 130, a buffer storage unit 140, a data storage unit 150, a display unit 160, a digital signal processor (DSP) 170, an audio processor 180, a microphone 182, and a speaker 184.

The optical unit 110 provides an optical signal received from a subject to the image pickup unit 115. The optical unit 110 may include at least one of a zoom lens, which narrows or widens a view angle according to a focal length, and a focus lens, which focuses the subject. Also, the optical unit 110 may further include an iris for controlling intensity of light.

The optical driver 111 adjusts a location of a lens, opening and closing of an iris, and etc. The optical driver 111 may adjust the intensity of light by adjusting closing and opening of the iris. The optical driver 111 may control the optical unit 110 according to a control signal, which is automatically generated by an image signal received in real time or manually received by manipulation of a user.

An optical signal that penetrated the optical unit 110 forms an image of the subject on a light receiving surface of the image pickup unit 115. The image pickup unit 115 may use a charge coupled device (CCD) or a complementary metal oxide semiconductor image sensor (CIS), which converts an optical signal to an electric signal. Sensitivity or the like of the image pickup unit 115 may be adjusted by the image pickup unit controller 116. The image pickup unit controller 116 may control the image pickup unit 115 according to a control signal, which is automatically generated by an image signal received in real time or manually received by manipulation of a user.

The manipulator 120 externally receives a control signal, for example, from a user. The manipulator 120 may include a shutter-release button for receiving a shutter-release signal for photographing an image by exposing the image pickup unit 115 to light for a predetermined time, a power supply button for supplying power, a pantoscopic-zoom button and telescopic-zoom button for widening or narrowing a view angle according to an input, and various functional buttons for inputting characters, selecting a mode, such as a photographing mode and a reproducing mode, selecting a white balance setting function, and selecting an exposure setting function. The manipulator 120 may include various buttons as above, but a form of the manipulator 120 is not limited as long as the manipulator 120 is able to receive an input of a user. Examples of the manipulator 120 include a keyboard, a touch pad, a touch screen, and a remote controller.

The digital photographing apparatus 100 includes the program storage unit 130, which stores programs such as an operating system for driving a digital camera and an application system, the buffer storage unit 140, which temporarily stores data required to perform operations or result data, and the data storage unit 150, which stores various types of information required in the program and an image file including an image signal.

Moreover, the digital photographing apparatus 100 includes the display unit 160 for displaying an operating status of the digital photographing apparatus 100 or information of an image photographed by the digital photographing apparatus 100.

The display unit 160 may provide visual information and/or auditory information to the user. For providing the visual information, the display unit 160 may be, e.g., a liquid crystal display panel (LCD), organic light emitting display panel (OLED), or an electrophoretic display panel (EPD).

The digital photographing apparatus 100 also includes the DSP 170, which processes a received image signal and controls each element according to the received image signal or an external input signal.

The microphone 182 converts a sound from the outside of the digital photographing apparatus 100 to an electric audio signal. The microphone 182 transmits the electric audio signal to the audio processor 180. A type of the microphone 182 is not limited as long as the microphone 182 is embedded in or connected to the digital photographing apparatus 100.

The audio processor 180 processes and transmits the received electric audio signal to the DSP 170. When the user reproduces a moving image file, the audio processor 180 processes and provides audio data received from the DSP 170 to the speaker 184.

The speaker 184 changes an electric signal to a vibration of a diaphragm and reproduces a sound wave. When the moving image file is reproduced, the speaker reproduces audio data included in the moving image file to a sound wave.

Figure 2:
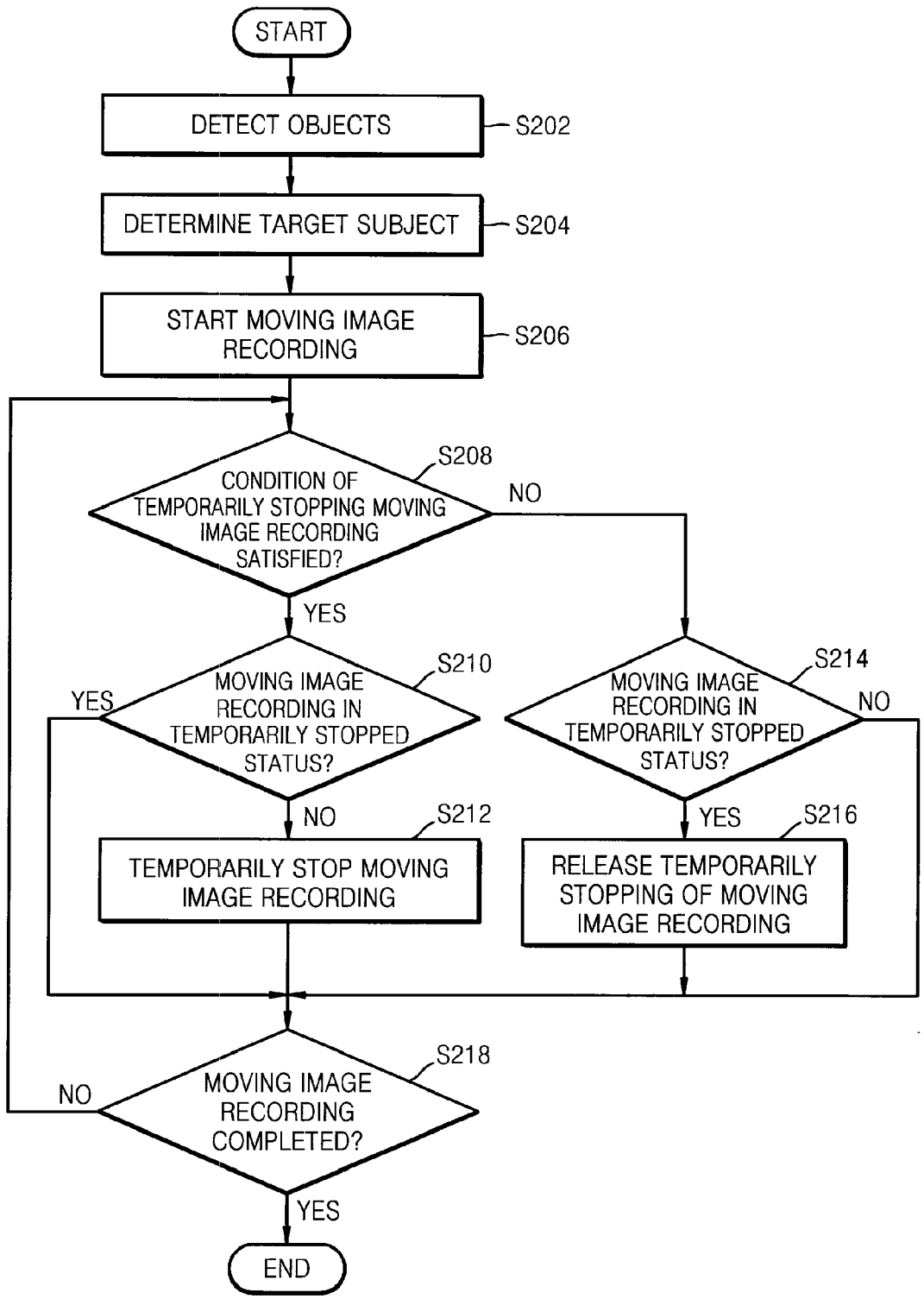
FIG. 2 is a flowchart of a method of controlling a digital photographing apparatus, according to an embodiment of the present invention.

FIG. 2 is a flowchart of a method of controlling a digital photographing apparatus, according to an embodiment of the present invention.

When a user wants to restart moving image recording when a function of temporarily stopping the moving image recording is performed by pushing a button for temporarily stopping the moving image recording during the moving image recording, the user needs to push the button again. However, when a user does not recognize this and does not release the function, a moving image is not recorded, and thus desired information is not stored. Although the display unit 160 of the digital photographing apparatus 100 of FIG. 1 displays a photographing status, i.e., whether the digital photographing apparatus 100 is temporarily stopped, the user may not recognize this. Specifically, when a moving image is recorded outdoors, a screen of the display unit 160 may not be clear, and thus the user may be unable to check the recording status. Also, when the user is not familiar with manipulating the digital photographing apparatus 100, the user may not recognize the recording status.

According to an embodiment of the present invention, the function of temporarily stopping the moving image recording is automatically performed. The function is automatically performed based on whether a target subject that the user desires to record exists. Accordingly, the user may select a target subject for determining the temporarily stopping of the moving image recording. Specifically, according to an embodiment of the present invention, objects in a moving image photographing domain are automatically detected by using an object recognizing algorithm, and the user selects the target subject from among the detected objects. Consequently, it is convenient for the user to indicate the target subject.

The method will now be described with reference to FIG. 2.

Figure 4:
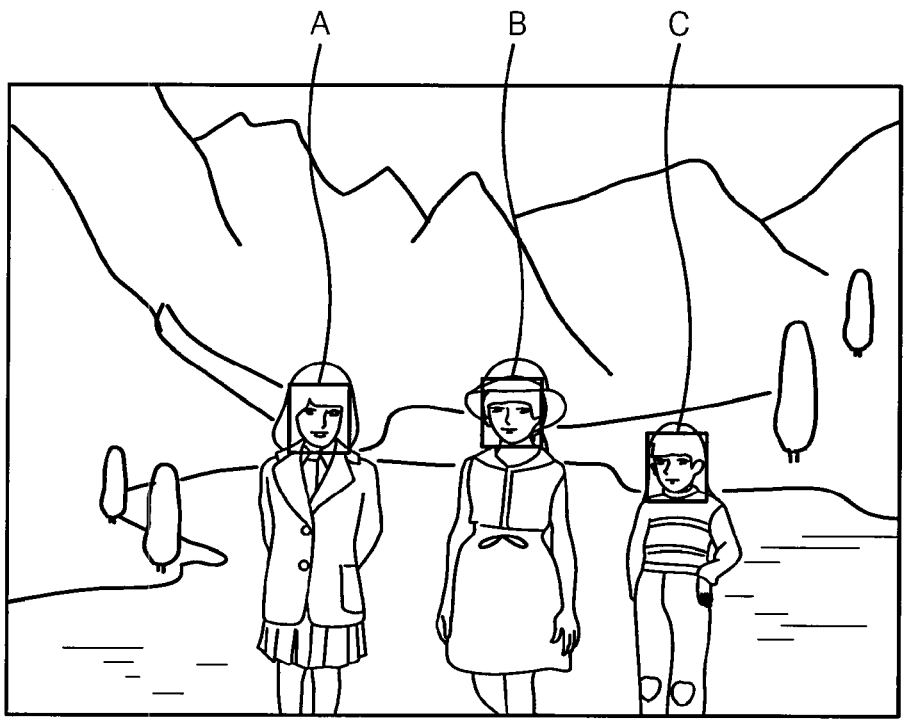
FIG. 4 is a pictorial diagram illustrating a display unit which displays an object detected in a moving image photographing domain, according to an embodiment of the present invention.

In order to automatically temporarily stop moving image recording, the method detects objects in a moving image photographing domain in operation 202. Accordingly, the digital photographing apparatus 100 may use various types of object recognizing algorithms. An object recognizing algorithm is selected according to a type of an object to be detected. For example, when a face of a person is to be detected, a face recognizing algorithm is used. Alternatively, the method may include indicating a domain that a detected object exists and displaying the display unit 160 as illustrated in FIG. 4.

When objects are detected in the moving image photographing domain, a target subject is determined from among the detected object in operation S204. Here, the target subject denotes a standard for determining whether to temporarily stop the moving image recording. For example, a condition of temporarily stopping the moving image recording may be temporarily stopping the moving image recording when the target subject does not exist in the moving image photographing domain.

The target subject may be determined according to a user input or automatically determined by the digital photographing apparatus 100. The target subject may be determined by selecting an object from among the detected objects.

When the target subject is determined, the moving image recording begins automatically or according to a user input in operation S206.

When the moving image recording begins, it is determined whether the condition is satisfied in operation S208. The condition according to an embodiment of the present invention is whether the target subject exists or not. For example, the condition may be temporarily stopping the moving image recording when the target subject does not exist in the moving image photographing domain.

When it is determined that the condition is satisfied in operation S208, it is determined whether the moving image recording is in a temporarily stopped status operation S210. When the moving image recording is in the temporarily stopped status, the temporarily stopped status is maintained, and when the moving image recording is not in the temporarily stopped status, the digital photographing apparatus 100 temporarily stops the moving image recording in operation S212.

When it is determined that the condition is not satisfied in operation S208, it is determined whether the moving image recording is in a temporarily stopped status in operation S214. When the moving image recording is in the temporarily stopped status, the temporarily stopping of the moving image recording is released in operation S216, and when the moving image recording is not in the temporarily stopped status, the moving image recording continues.

Then, it is determined whether the moving image recording is completed in operation S218. When the moving image recording is not completed, operations S208 through S218 are repeated until the moving image recording is completed. For example, operation S208 may be periodically performed.

Figure 3:
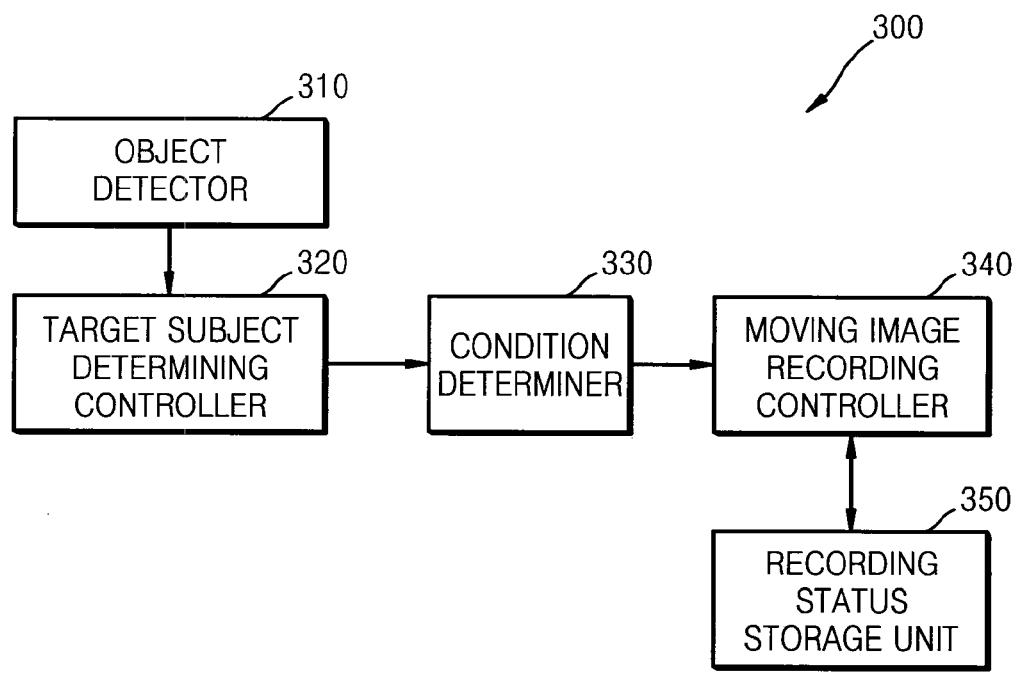
FIG. 3 is a block diagram illustrating a structure of a digital photographing apparatus, according to an embodiment of the present invention.

FIG. 3 is a block diagram illustrating a structure of a digital photographing apparatus 300, according to an embodiment of the present invention.

The digital photographing apparatus 300 includes an object detector 310, a target subject determining controller 320, a condition determiner 330, a moving image recording controller 340, and a recording status storage unit 350.

The object detector 310 detects objects in a moving image photographing domain. The detected objects may be faces of people. The object detector 310 may be realized by the DSP 170 of FIG. 1 performing an object recognizing algorithm stored in the program storage unit 130 of FIG. 1. The object detector 310 may display the detected objects on the display unit 160 in a selectable form, by displaying the objects in a rectangular box as illustrated in FIG. 4.

The target subject determining controller 320 determines a target subject from among the objects detected by the object detector 310, based on a user input or a predetermined standard. Here, the number of target subject may be one or more.

The condition determiner 330 determines whether a condition of temporarily stopping moving image recording is satisfied. The condition according to an embodiment is whether the target subject exists in a moving image photographing domain. The condition may be predetermined by a designer, or selected by a user.

The moving image recording controller 340 controls a function of temporarily stopping the moving image recording based on whether the condition is satisfied that is determined by the condition determiner 330. When the condition is satisfied, the moving image recording controller 340 temporarily stops the moving image recording, and when the condition is not satisfied, the moving image recording controller 340 releases the temporarily stopping of the moving image recording.

When the condition is satisfied, the moving image recording controller 340 controls the digital photographing apparatus 300 so as to temporarily stop the moving image recording. In other words, when the moving image recording is in a temporarily stopped status, the moving image recording controller 340 maintains the temporarily stopped status, and when the moving image recording is not in the temporarily stopped status, the moving image recording controller 340 temporarily stops the moving image recording.

When the condition is not satisfied, the moving image recording controller 340 controls the digital photographing apparatus 300 to release the temporarily stopping of the moving image recording. In other words, when the moving image recording is in the temporarily stopped status, the moving image recording controller 340 proceeds the moving image recording by releasing the temporarily stopped status, and when the moving image recording is not in the temporarily stopped status, the moving image recording controller 340 continuously proceeds the moving image recording.

A recording status of the moving image recording is read from the recording status storage unit 350.

The moving image recording controller 340 determines whether the condition is satisfied, and the recording status is updated in the recording status storage unit 350 after each cycle of controlling the function of temporarily stopping the moving image recording based on whether the condition is satisfied. A form of the recording status storage unit 350 is not limited as long as the recording status storage unit 350 is a storage space wherein data is re-written.

The target subject determining controller 320, the condition determiner 330, and the moving image recording controller 340 may be realized by the DSP 170 of FIG. 1 reading and executing a program, which is programmed to perform the above described functions of the target subject determining controller 320, the condition determiner 330, and the moving image recording controller 340, and stored in the program storage unit 130 of FIG. 1.

FIG. 5 is a flowchart illustrating a method of controlling a digital photographing apparatus, according to another embodiment of the present invention.

In the method according to this embodiment of the present invention, a user selects one target subject from among detected objects. A condition of temporarily stopping moving image recording is temporarily stopping moving image recording when the target subject selected by the user does not exist in a moving image photographing domain.

In order to automatically control temporarily stopping of the moving image recording, objects in a moving image photographing domain are detected in operation S402. The objects may be faces of people. When the faces are recognized, domains of the faces may be displayed on the display unit 160 as shown in FIG. 4.

Then, the user selects one object from among detected objects A, B, and C of FIG. 4, and determines the selected object as a target subject in operation S404. Here, the user may select one of the objects A, B, and C displayed on the display unit 160 by using the manipulator 120 of the digital photographing apparatus 100.

When the target subject is determined, moving image recording starts in operation S406.

In operation S408, it is periodically determined whether the target subject exists in the moving image photographing domain during the moving image recording. When the target subject exists in the moving image photographing domain, the moving image recording is continued. In other words, when it is determined that the moving image recording is in a temporarily stopped status in operation S410, the temporarily stopping of the moving image recording is released in operation S412, and when it is determined that the moving image recording is not in the temporarily stopped status in operation S410, the moving image recording is continued. When it is determined that the target subject does not exist in the moving image photographing domain, the moving image recording is temporarily stopped in operation S416. In other words, when it is determined that the moving image recording is in the temporarily stopped status in operation S414, the temporarily stopped status is maintained, and when it is determined that the moving image recording is not in the temporarily stopped status in operation S414, the moving image recording is temporarily stopped.

In operation S418, it is determined whether the moving image recording is completed. When the moving image recording is not completed, operations S408 through S418 are repeated. Operations S408 through S418 are repeated until the moving image recording is completed. For example, operation S408 may be periodically performed.

Figure 6A:
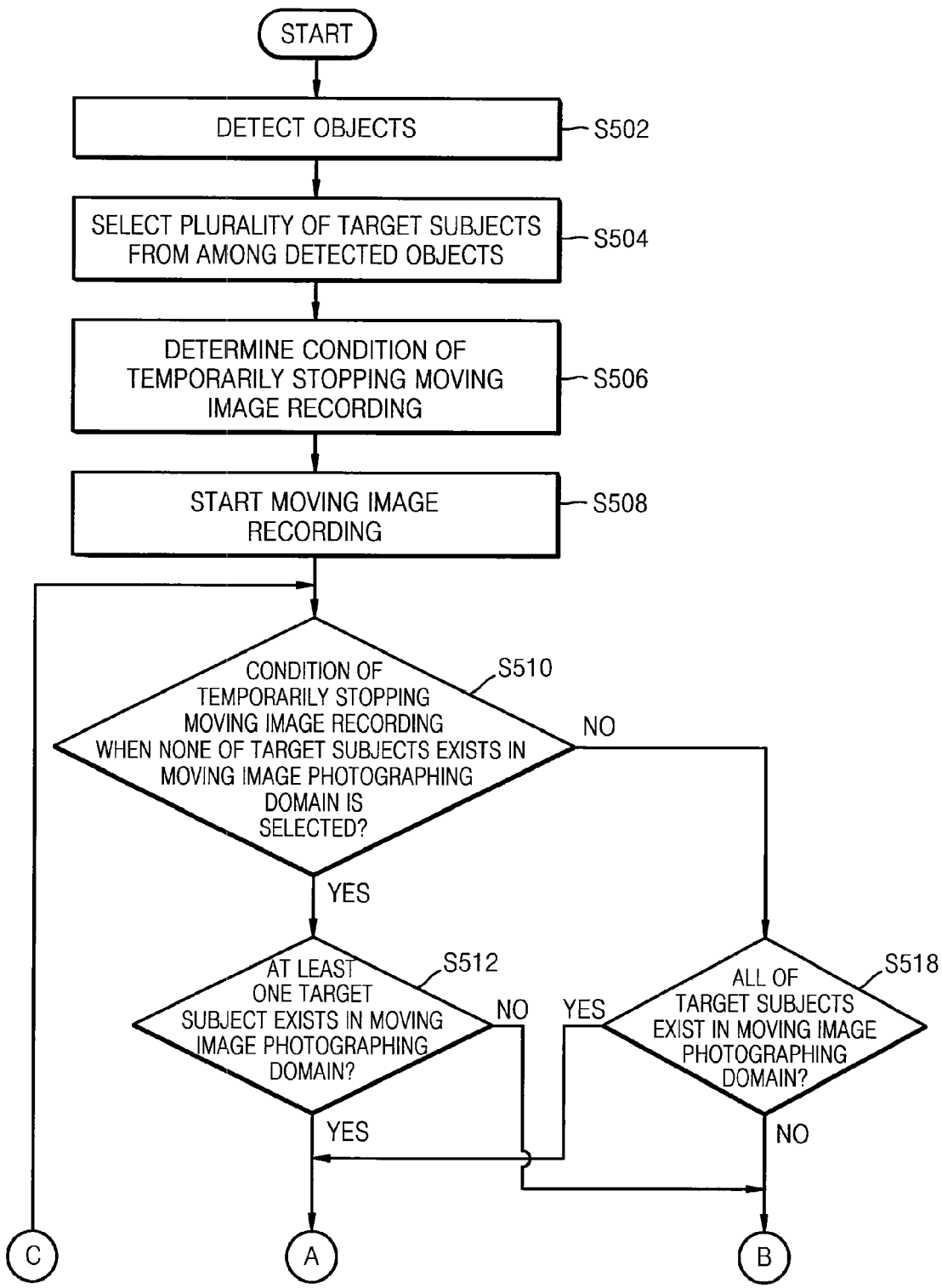
FIGS. 6A and B comprise a flowchart illustrating a method of controlling a digital photographing apparatus, according to another embodiment of the present invention.
Figure 6B:
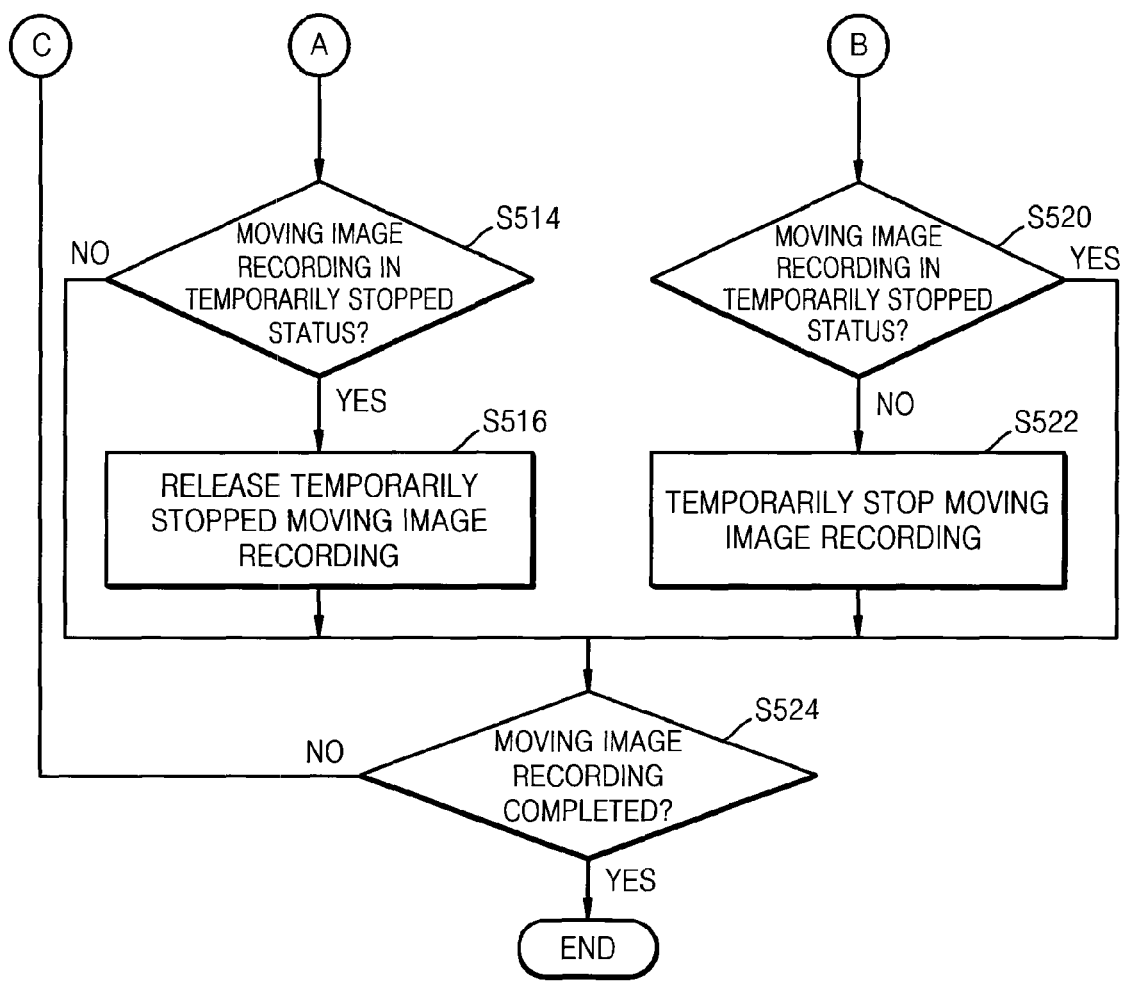

FIGS. 6A and B comprise a flowchart illustrating a method of controlling a digital photographing apparatus, according to another embodiment of the present invention.

In the method according to this embodiment, a user selects at least two target subjects from among detected objects. Also, a condition of temporarily stopping moving image recording may be one of determining whether all of the at least two target subjects exist or determining whether at least one of the at least two target subjects exist in a moving image photographing domain.

In operation S502, objects existing in the moving image photographing domain are detected. The objects may be faces of people. When the faces are detected, domains of the faces are displayed on the display unit 160 as shown in FIG. 4.

Then, a user selects at least two objects from among the objects A, B, and C of FIG. 4, and the at least two objects selected by the user are determined as target subjects in operation S504. Here, the user may select at least two of the objects A, B, and C displayed on the display unit 160 by using the manipulator 120 of the digital photographing apparatus 100. According to another embodiment, a number of objects that is indicated as the target subjects may be predetermined or continuously added until the user completes the selecting of the target subjects.

When the target subjects are determined, the condition of temporarily stopping the moving image recording is determined in operation S506. The condition is whether to continue the moving image recording based on a number of target subjects existing in the moving image photographing domain. For example, when two target subjects are selected, the condition may be one of temporarily stopping the moving image recording when none of the target subjects exists in the moving image photographing domain or when at least one of the target subjects does not exist in the moving image photographing domain. Also, when four target subjects are selected, the condition may be one of temporarily stopping the moving image recording when at least one target subject does not exist, when at least two target subjects do not exist, when at least three target subjects do not exist, or when all of the target subjects do not exist in the moving image photographing domain.

When the condition is determined, the moving image recording starts in operation S508.

Then, it is determined whether the condition is satisfied.

When the condition is selected to be temporarily stopping the moving image recording when none of the target subjects exists in the moving image photographing domain in operation S510, it is determined whether at least one of the target subjects exists in the moving image photographing domain in operation S512. For example, when the user selects the objects A and B of FIG. 4 as the target subjects and the condition of temporarily stopping the moving image recording when none of the target subjects exists in the moving image photographing domain, the moving image recording continues when the object A exists, when the object B exists, or when the objects A and B exist in the moving image photographing domain, and the moving image recording is temporarily stopped when all of the objects A and B do not exist in the moving image photographing domain. Accordingly, when none of the target subjects exists in the moving image photographing domain, the moving image recording is temporarily stopped, and when at least one of the target subjects exists in the moving image photographing domain, the moving image recording is continued.

When the user selects the condition of temporarily stopping the moving image recording when at least one of the target subjects does not exist in operation S510, it is determined whether all of the target subjects exist in the moving image photographing domain in operation S518. For example, when the user selects the objects A and B of FIG. 4 as the target subjects and the condition of temporarily stopping the moving image recording when at least one of the target subjects does not exist in the moving image photographing domain, the moving image recording is continued when all of the objects A and B exist in the moving image photographing domain, and the moving image recording is temporarily stopped when only object A or B, or none of the objects A and B exists in the moving image photographing domain. Accordingly, the moving image recording is continued only when all of the target subjects exist in the moving image photographing domain, and the moving image recording is temporarily stopped when at least one of the target subjects does not exist in the moving image photographing domain.

In operation S524, it is determined whether the moving image recording is completed. When the moving image recording is not completed, operations S510 through S524 are repeated. Operations S510 through S524 are repeated until the moving image recording is completed. For example, operation S510 may be periodically performed.

FIG. 7 is a flowchart illustrating a method of controlling a digital photographing apparatus, according to another embodiment of the present invention.

In the method according to this embodiment, a target subject is automatically determined based on a predetermined target subject determining standard. The target subject determining standard may be predetermined by a designer and/or a user. The target subject determining standard may be determining an object in the middle of detected objects as a target subject or determining an object that is nearest to the center of a moving image photographing domain as a target subject.

When the target subject determining standard is to determine the object in the middle of the detected objects as the target subject, the object B from among the objects A, B, and C of FIG. 4 is automatically determined as the target subject. During moving image recording, the user usually places an object that the user is most interested in the center of a moving image photographing domain, and thus by using the target subject determining standard, which determines the object in the middle of the detected objects as the target subject, the object that the user is most interested in is automatically determined as the target subject without manipulation of the user. Accordingly, it is convenient for the user since a requirement of the user is applied during the moving image recording.

In operation S602, objects existing in the moving image photographing domain are detected. The objects may be faces of people. When the faces are detected, domains of the faces are displayed on the display unit 160 as shown in FIG. 4.

When the objects are detected, a target subject is determined from among the objects A, B, and C of FIG. 4 according to the predetermined target subject determining standard in operation S604, and the moving image recording is started in operation S606.

Then, it is determined whether a condition of temporarily stopping the moving image recording is satisfied. Operations S608 through S618 are identical to operations S408 through S418 of FIG. 5, and thus descriptions thereof are omitted herein.

Figure 8:
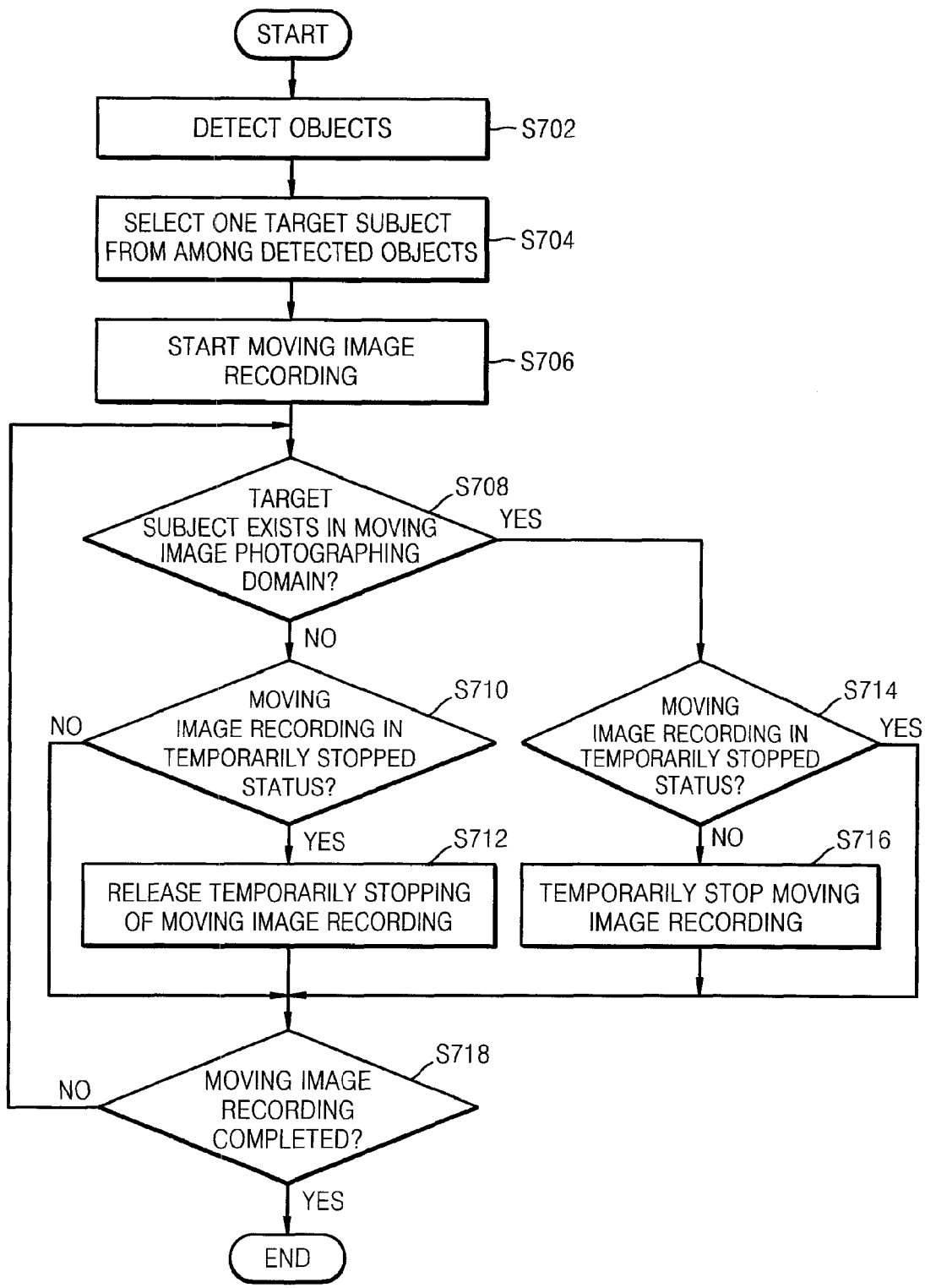
FIG. 8 is a flowchart illustrating a method of controlling a digital photographing apparatus, according to another embodiment of the present invention.

FIG. 8 is a flowchart illustrating a method of controlling a digital photographing apparatus, according to another embodiment of the present invention.

The moving image recording is proceeded only when the target subject does not exist in the moving image photographing domain, and the moving image recording is temporarily stopped when the target subject exists in the moving image photographing domain. When an object that a user wants to exclude from a moving image exists in the moving image photographing domain, the moving image recording is temporarily stopped. Accordingly, it is convenient for the user since a requirement of the user is applied during the moving image recording.

In order to automatically control temporarily stopping of the moving image recording, objects existing in the moving image photographing domain are detected in operation S702. The objects may be faces of people. When the faces are detected, domains of the faces are displayed on the display unit 160 as shown in FIG. 4.

When the user selects one object from among detected objects A, B, and C of FIG. 4, the object selected by the user is determined as the target subject in operation S704. Here, the user may select one of the objects A, B, and C displayed on the display unit 160 by using the manipulator 120 of the digital photographing apparatus 100.

When the target subject is determined, the moving image recording is started in operation S706.

In operation S708, it is periodically determined whether the target subject exists in the moving image photographing domain. When the target subject does not exist in the moving image photographing domain, the moving image recording is continued. In other words, when it is determined that the moving image recording is in a temporarily stopped status in operation S710, the temporarily stopping of the moving image recording is released in operation S712, and when it is determined that the moving image recording is not in the temporarily stopped status in operation S710, the moving image recording is continued. When the target subject exists in the moving image photographing domain, the moving image recording is temporarily stopped. In other words, when it is determined that the moving image recording is in the temporarily stopped status in operation S714, the temporarily stopped status is maintained, and when the moving image recording is not in the temporarily stopped status in operation S714, the moving image recording is temporarily stopped in operation S716.

In operation S718, it is determined whether the moving image recording is completed. When the moving image recording is not completed, operations S708 through S718 are repeated. Operations S708 through S718 are repeated until the moving image recording is completed. For example, operation S708 may be periodically performed.

Figure 9:
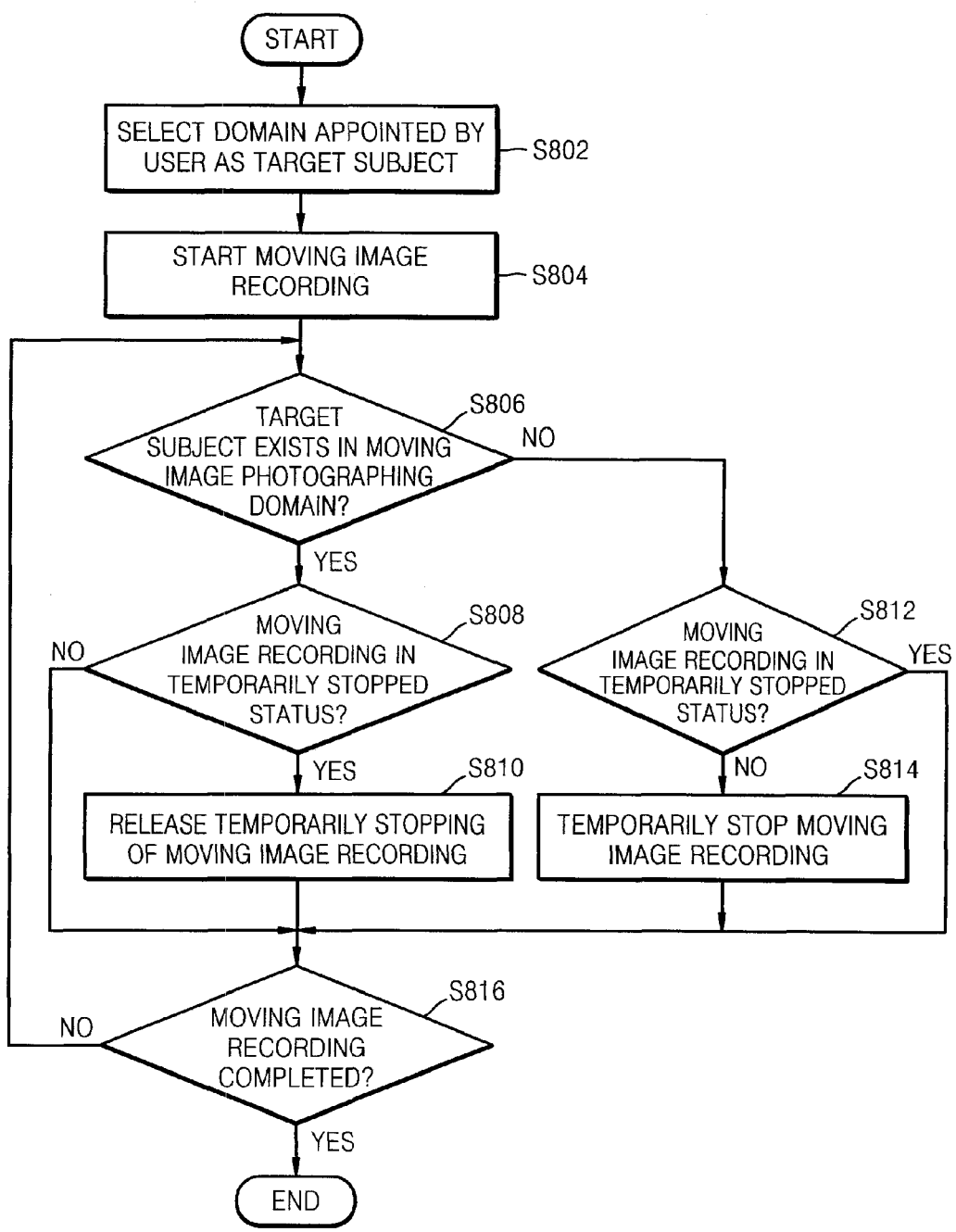
FIG. 9 is a flowchart illustrating a method of controlling a digital photographing apparatus, according to another embodiment of the present invention.

FIG. 9 is a flowchart illustrating a method of controlling a digital photographing apparatus, according to another embodiment of the present invention.

In the method according to this embodiment, a user directly indicates a target subject. Accordingly, a process of automatically detecting objects is not performed. Instead, the user directly inputs a domain to be indicated as the target subject, and thus the target subject is indicated according to a user input. The user may input the domain to be indicated as the target subject by using a touch screen or an input key. When the target subject is determined according to the user input, moving image recording is proceeded only when the target subject exists in a moving image photographing domain, and the moving image recording is temporarily stopped when the target subject does not exist in the moving image photographing domain.

When the user inputs a domain to be indicated as a target subject in operation S802, moving image recording is started in operation S804.

Then, it is determined whether a condition of temporarily stopping moving image recording is satisfied. Operations S806 through S816 are identical to operations S408 through S418 of FIG. 5, and thus details thereof are omitted herein.

The digital photographing apparatus 300 may be configured to perform the methods according to above embodiments.

The object detector 310 may be realized by using the program storage unit 130, which stores object detecting algorithms for detecting objects, and the DSP 170 of FIG. 1. For example, when the objects are faces of people, a face recognizing algorithm is performed. Also, since one of the embodiments does not include the process of detecting objects, the object detector 310 may not be included.

The target subject determining controller 320 may be differently configured based on a standard for determining a target subject in each embodiment. For example, the target subject determining controller 320 may determine an object indicated by a user from among detected objects as a target subject, or determine at least two objects indicated by the user from among the detected objects as the target subject. Also, the target subject determining controller 320 may determine the target subject from among the detected objects according to a predetermined target subject determining standard, or may determine a domain indicated by the user as the target subject.

The condition determiner 330 determines whether a condition of temporarily stopping moving image recording is satisfied in each embodiment. The condition determiner 330 may proceed the moving image recording when the target subject exists in a moving image photographing domain, and temporarily stop the moving image recording when the target subject does not exist in the moving image photographing domain. Alternatively, the condition determiner 330 may determine the condition according to a user input, and temporarily stop the moving image recording when the condition is satisfied. Here, the condition may be one of temporarily stopping the moving image recording when none of a plurality of target subjects exists in the moving image photographing domain and when at least one of the plurality of target subjects does not exist in the moving image photographing domain. Also, the condition determiner 330 may proceed the moving image recording when the target subject does not exist in the moving image photographing domain, and temporarily stop the moving image recording when the target subject exists in the moving image photographing domain.

According to various embodiments of the present invention, a function of temporarily stopping moving image recording is automatically provided without manipulation of a user while a digital photographing apparatus is recording a moving image. Specifically, a condition of temporarily stopping moving image recording is determined by a user, and thus the function suitable to a requirement of the user is provided.

The devices described herein may be implemented on any form of processor or processors. The device may comprise a memory for storing program data and executing it, a permanent storage such as a disk drive, a communications port for handling communications with external devices, and user interface devices, including a display, keyboard, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems. This media can be read by the device, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method of controlling a digital photographing apparatus, the method comprising:
    (a) determining a target subject;
    (b) determining, by the digital photographing apparatus, whether the target subject exists in a moving image photographing domain; and
    (c) if the target subject exists in the photographing domain, then if the image recording is in a temporarily stopped status,
        releasing the temporary stopping of the moving image recording;
    (d) otherwise, if the target subject does not exist in the photographing domain, then
        if the image recording is not in a temporarily stopped status, temporarily stopping the moving image recording;
    (e) repeating steps (b) through (d) until the recording is completed.

2. The method of claim 1,
    wherein in step (a) the determining of the target subject involves determining at least one of a plurality of objects as the target subject.

3. The method of claim 2, wherein the objects are faces of people.

4. The method of claim 2, wherein:
    the at least one object is selected by a user from among the plurality of objects as the target subject.

5. The method of claim 2, wherein the target subject is comprised of a plurality of target subjects from a plurality of objects selected by a user from a plurality of detected objects and step (d) is performed when none of the plurality of target subjects exist in the moving image photographing domain, and
    step (c) is performed when at least one of the plurality of target subjects does not exist in the moving image photographing domain.

6. The method of claim 1, wherein:
    in step (a) the determining of the target subject determines the target subject from among a plurality of detected objects based on a predetermined target subject determining standard.

7. The method of claim 6, wherein the predetermined target subject determining standard is at least one of determining an object in the middle from among the detected objects as the target subject, and determining an object that is nearest to the center of the moving image photographing domain as the target subject.

8. The method of claim 1, wherein:
    in step (a) the determining of the target subject determines an object selected by a user from among a plurality of detected objects as the target.

9. The method of claim 1, wherein:
    in step (a) the determining of the target subject determines a domain indicated by a user as the target subject.

10. A digital photographing apparatus comprising:
a target subject determining controller which determines a target subject;
a condition determiner which determines whether the target subject exists in a moving image photographing domain; and
a moving image recording controller which operates such that,
if the target subject exists in the photographing domain, then if the image recording is in a temporarily stopped status, releasing the temporary stopping of the moving image recording;
otherwise, if the target subject does not exist in the photographing domain, then if the image recording in not in a temporarily stopped status, temporarily stopping the moving image recording; and
repeating operation with the condition determiner and the moving image recording controller until the recording is completed.

11. The digital photographing apparatus of claim 10, further comprising an object detector which detects objects existing in the moving image photographing domain, wherein the target subject determining controller determines at least one of the detected objects as the target subject.

12. The digital photographing apparatus of claim 11, wherein the objects are faces of people.

13. The digital photographing apparatus of claim 11, wherein:
the target subject determining controller determines an object selected by a user from among the objects detected by the object determiner as the target subject, and
the condition is temporarily stopping the moving image recording when the target subject does not exist in the moving image photographing domain.

14. The digital photographing apparatus of claim 11, wherein:
the target subject determining controller determines a plurality of objects selected by a user from among the objects detected by the object detector as a plurality of target subjects,
the condition is determined according to a user input, and
the condition determiner:
determines that the condition is satisfied when none of the plurality of target subjects exist in the moving image photographing domain in case that the condition is temporarily stopping the moving image recording when none of the plurality of target subjects exist in the moving image photographing domain, and
determines that the condition is satisfied in case that at least one of the plurality of target subjects does not exist in the moving image photographing domain in case that the condition is temporarily stopping the moving image recording when at least one of the plurality of target subjects does not exist in the moving image photographing domain.

15. The digital photographing apparatus of claim 11, wherein:
the target subject determining controller determines the target subject from among the objects detected by the object detector according to a predetermined target subject determining standard, and
the condition is temporarily stopping the moving image recording when the target subject does not exist in the moving image photographing domain.

16. The digital photographing apparatus of claim 15, wherein the target subject determining standard is at least one of determining an object in the middle of the detected objects as the target subject, and determining an object that is nearest to the center of the moving image photographing domain as the target subject.

17. The digital photographing apparatus of claim 11, wherein:
the target subject determining controller determines an object selected by a user from among the objects detected by the object determiner as the target subject, and
the condition is temporarily stopping the moving image recording when the target subject exists in the moving image photographing domain.

18. The digital photographing apparatus of claim 10, wherein:
the target subject determining controller determines a domain indicated by a user as the target subject, and
the condition is temporarily stopping the moving image recording when the target subject does not exist in the moving image photographing domain.

19. The digital photographing apparatus of claim 18, wherein:
the moving image recording controller releases the temporarily stopping of the moving image recording when the condition determiner determines that the condition is not satisfied and the moving image recording is temporarily stopped, and
the condition determiner periodically determines whether the condition is satisfied until the moving image recording is completed.

20. A non-transitory computer readable storage medium storing thereon instructions for a computer program that are executable on a processor, comprising:
(a) code for determining a target subject;
(b) code for determining whether the target subject exists in a moving image photographing domain by a digital photographing apparatus;
(c) code for, if the target subject exists in the photographing domain and if the image recording is in a temporarily stopped status, releasing the temporary stopping of the moving image recording; and
(d) code for, if the target subject does not exist in the photographing domain and if the image recording is not in a temporarily stopped status, temporarily stopping the moving image recording; and
(e) code for re-executing the code for (b) through (d) until the recording is completed.

21. The computer readable storage medium of claim 20, wherein the computer program further comprises code for detecting objects existing in the moving image photographing domain, wherein the code for determining the target subject determines at least one of the detected objects as the target subject.

* * * * *